United States Patent
Barocela et al.

(10) Patent No.: US 7,137,592 B2
(45) Date of Patent: *Nov. 21, 2006

(54) HIGH-ASPECT RATIO HYBRID AIRSHIP

(75) Inventors: Edward Barocela, Ballwin, MO (US); Patrick F. Cassidy, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/853,300

(22) Filed: May 24, 2004

(65) Prior Publication Data

US 2005/0269441 A1 Dec. 8, 2005

(51) Int. Cl.
*B64B 1/06* (2006.01)
*B64C 1/00* (2006.01)

(52) U.S. Cl. ............... 244/29; 244/123.11; 244/900

(58) Field of Classification Search .......... 244/24–33, 244/59, 123.11, 123.1, 125–128, 900–903, 244/93–99

See application file for complete search history.

(56) References Cited

U.S. PATENT DOCUMENTS

| | | | | |
|---|---|---|---|---|
| 510,492 A | * | 12/1893 | Sumovski | 244/30 |
| 2,104,144 A | * | 1/1938 | Zand | 244/129.5 |
| 2,886,265 A | * | 5/1959 | Ritter et al. | 244/117 R |
| 2,967,573 A | * | 1/1961 | Johnson, Jr. | 416/84 |
| 2,979,287 A | * | 4/1961 | Ross | 244/219 |
| 3,153,878 A | * | 10/1964 | Smith, Jr. | 446/225 |
| 3,180,590 A | * | 4/1965 | Fitzpatrick | 244/30 |
| 3,463,420 A | * | 8/1969 | Carter et al. | 244/46 |
| 3,481,569 A | * | 12/1969 | Bell | 244/123.11 |
| 3,486,719 A | * | 12/1969 | Bock et al. | 244/25 |
| 3,559,920 A | * | 2/1971 | Moore | 244/5 |
| 3,893,639 A | * | 7/1975 | Croswell, Jr. | 244/219 |
| 3,957,232 A | * | 5/1976 | Sebrell | 244/123.11 |
| 4,052,025 A | * | 10/1977 | Clark et al. | 244/25 |
| 4,102,519 A | * | 7/1978 | Crosby, Jr. | 244/125 |
| 4,149,688 A | * | 4/1979 | Miller, Jr. | 244/12.4 |
| 4,151,893 A | * | 5/1979 | Mantle | 180/116 |
| 4,209,148 A | * | 6/1980 | Lemoigne | 244/16 |
| 4,261,534 A | * | 4/1981 | Roselli | 244/22 |
| 4,403,755 A | * | 9/1983 | Gutsche | 244/53 R |
| 4,725,021 A | * | 2/1988 | Priddy | 244/123.11 |

(Continued)

OTHER PUBLICATIONS www.travel.howstuffworks.com/blimp1.htm, "How Blimps Work".*

(Continued)

*Primary Examiner*—Frank Palo
*Assistant Examiner*—S. A. Holzen
(74) *Attorney, Agent, or Firm*—Ingrassia Fisher & Lorenz, P.C.

(57) ABSTRACT

In one aspect, a hybrid airship including an outer shell, a plurality of helium filled gas envelopes, and an all-electric propulsion system can have a high-aspect ratio wing shape. In some embodiments, the hybrid airship may be launched using buoyancy lift alone and aerodynamic lift may be provided by the all-electric propulsion system. In one aspect, a photovoltaic array and a high energy density power storage system may be combined to power the propulsion system making the propulsion system regenerative. The high-aspect ratio wing shape provides low drag, and can allow the hybrid airship to fly at an altitude of at least about 100,000 ft. By continuously recharging the power storage system, the hybrid airship in accordance with some embodiments can stay aloft for months or even years. The hybrid airship may function as a military intelligence, surveillance, and reconnaissance and communications relay platform.

17 Claims, 5 Drawing Sheets

U.S. PATENT DOCUMENTS

| | | | | |
|---|---|---|---|---|
| 4,768,738 | A * | 9/1988 | Weinert | 244/53 R |
| 4,907,764 | A * | 3/1990 | Long | 244/62 |
| 5,005,783 | A * | 4/1991 | Taylor | 244/97 |
| 5,503,350 | A * | 4/1996 | Foote | 244/1 R |
| 5,518,205 | A * | 5/1996 | Wurst et al. | 244/58 |
| 5,755,402 | A * | 5/1998 | Henry | 244/29 |
| 5,810,284 | A * | 9/1998 | Hibbs et al. | 244/13 |
| 6,082,667 | A * | 7/2000 | Haggard | 244/35 R |
| 6,302,357 | B1 * | 10/2001 | Kalisz | 244/30 |
| 6,398,160 | B1 * | 6/2002 | Hsia | 244/35 R |
| 6,527,223 | B1 * | 3/2003 | Mondale | 244/30 |
| 6,581,873 | B1 * | 6/2003 | McDermott | 244/25 |
| 6,742,741 | B1 * | 6/2004 | Rivoli | 244/12.1 |
| 6,860,449 | B1 * | 3/2005 | Chen | 244/12.1 |
| 6,910,661 | B1 * | 6/2005 | Dockter et al. | 244/218 |
| 2002/0084386 | A1 * | 7/2002 | Hsia | 244/161 |
| 2002/0096599 | A1 * | 7/2002 | McDermott | 244/25 |
| 2003/0127560 | A1 * | 7/2003 | Liss | 244/30 |
| 2003/0127566 | A1 * | 7/2003 | Hsia | 244/161 |
| 2003/0127567 | A1 * | 7/2003 | Hsia | 244/161 |
| 2003/0141409 | A1 * | 7/2003 | Lisoski et al. | 244/13 |
| 2003/0192985 | A1 * | 10/2003 | Lipeles | 244/13 |
| 2005/0151007 | A1 * | 7/2005 | Cadogan et al. | 244/35 R |
| 2005/0258306 | A1 * | 11/2005 | Barocela et al. | 244/30 |
| 2005/0269441 | A1 * | 12/2005 | Barocela et al. | 244/25 |
| 2005/0274847 | A1 * | 12/2005 | Charron | 244/123.1 |

OTHER PUBLICATIONS

"Single", www.answers.com, p. 1, May 2, 2006.*

"Lift-induced drag." Wikipedia, The Free Encyclopedia. Apr. 20, 2006, 20:23 UTC. May 2, 2006, 16:32 <http://en.wikipedia.org/w/index.php?title=Lift-induced_drag&oldid=49336912>.*

David A. Fulghum, Northrop Grumman Unmanned Systems, Aviation week & Space Technology, Oct. 20, 2003, p. 70.

Kenneth Munson, Ohio Dynalifter, Jane's All the World's Aircraft 2004-2005, Feb. 13, 2004.

* cited by examiner

HIGH-ASPECT RATIO HYBRID AIRSHIP

BACKGROUND OF THE INVENTION

The present invention generally relates to unmanned aerial vehicles and airships and, more particularly, to a hybrid airship having the shape of a high-aspect ratio flying wing and to a method for using the high-aspect ratio hybrid airship as an unmanned reconnaissance aerial vehicle.

To enhance intelligence-gathering, surveillance, reconnaissance, and communications relay missions, it would be useful to have unmanned aerial vehicles available that can operate at very high altitudes and that have a high endurance. The capability to operate at very high altitudes is desirable to make the platform survivable against anti-aircraft threats, to maximize the line-of-sight radius for sensors and communications equipment, and to place the aircraft above the effects of atmospheric weather system. One of the challenges of designing a fixed wing aircraft to cruise at high altitudes is the achievement of a low structural weight. Such aircraft require large wing areas due to the very low density of air at high altitudes, so that the wing weight becomes a key design driver. A possible alternative to fixed wing aircraft is to carry the payload in a lighter-than-air vehicle, such as an airship, but very large volume gas envelopes are needed to achieve neutral buoyancy at high altitudes. Therefore, these lighter-than-air vehicles are large and heavy, which limits the altitude at which the vehicles can operate.

Prior art unmanned aerial vehicles include, for example, the Global Hawk, a high altitude, long-endurance unmanned aerial vehicle used by the US Air Force as a surveillance aircraft. The Global Hawk air vehicle is to provide high resolution synthetic aperture radar that can penetrate cloud-cover and sandstorms and electro-optical/infrared imagery at long range with long loiter times over target areas. The Global Hawk is capable of both wideband satellite and line-of-sight data link communications. The capabilities of the Global Hawk allow more precise targeting of weapons and better protection of forces through superior surveillance capabilities. However, while being a unmanned aircraft, the Global Hawk still is a reusable heavier-than-air craft using fossil fuels. The power output of conventional combustion engines and turbines decreases drastically at high altitudes because of the corresponding decrease in density of air, which is necessary to maintain the combustion of fossil fuels. A runway is needed for launching the Global Hawk and for the landing. The Global Hawk has an operating range of up to 3000 nautical miles from its launch area, with its loiter capability over the target area limited to about 24 to 36 hours at altitudes of about 60,000 to 66,000 feet. The operating range, the loiter time over a target area, and the altitude of the global hawk are limited since the Global Hawk still is an conventional heavier-than-air aircraft using fossil fuels. For future reconnaissance missions, unmanned aerial vehicles with even longer loiter capabilities over a target area at even higher altitudes are desired.

Concepts have been disclosed for futuristic unmanned aircraft missions that reach beyond the standard intelligence-gathering mission to very long-range strike, vertical operations, and ultra-long-endurance surveillance. One advanced concept was reported, for example, by David A. Fulghum in Aviation Week & Space Technology, Oct. 20, 2003, page 70. This article describes an-unmanned aerial vehicle disclosed by the Northrop-Grumman Unmanned Systems group in Rancho Bernardo, Calif. To optimize the benefit of flying without a crew, a four-engine Ultra-Hale (high-altitude, long-endurance) unmanned aerial vehicle is disclosed that is designed to stay aloft for three months with a surveillance sensor payload. Designed as a wing filled with a combination of hydrogen and helium to achieve zero buoyancy, the aircraft can be launched without a conventional runway. By using the explosive gas hydrogen, the disclosed aerial vehicle may not be safe to operate and prone to accidents. Once aloft, the aircraft takes about half a day using its combination powerplants (involving solar energy and fuel cells) to climb to an operating altitude of 80,000–120,000 ft. However, the endurance of the described flying wing aircraft and therefore of reconnaissance missions would be limited by the reliability and lifetime of the fuel cells, even if the fuel cells are supplemented by solar panels. Furthermore, endurance longer than the three months said to be reached by the described flying wing aircraft is desirable.

As can be seen, there is a need for an unmanned aerial vehicle that has a high endurance and can be operated at very high altitudes. Furthermore, there is a need for an unmanned aerial vehicle that does not depend on conventional runways for launching and landing. Also, there is a need for an unmanned aerial vehicle that may be used for intelligence-gathering, surveillance, reconnaissance, and communications relay missions at altitudes high enough to make the aerial vehicle survivable against anti-aircraft threats, to maximize the line-of-sight radius for sensors and communications equipment, and to place the aerial vehicle above the effects of atmospheric weather system. There has also arisen a need to provide an unmanned aerial vehicle that uses a propulsion system that is independent from fossil fuels and fuel cells and, therefore, does not limit the flight endurance of the aerial vehicle. There has also arisen a need to provide an aerial vehicle, such as a hybrid airship, that combines the advantages of heavier-than-air technology and lighter-than-air technology.

SUMMARY OF THE INVENTION

In accordance with an aspect of the present invention, a hybrid airship may be operated at very high altitudes and may be capable of very long flight endurances. In accordance with another aspect of the present invention, a hybrid airship may have the shape of a high-aspect ratio flying wing, and may be suitable for, but not limited to, surveillance and reconnaissance missions at both the strategic and tactical level, communications relay for military assets, and a platform for directed energy devices. Another aspect of the present invention may provide a method for using the high-aspect ratio hybrid airship as an unmanned reconnaissance aerial vehicle.

In one aspect of the present invention, a high-aspect ratio hybrid airship may comprise an outer shell, a plurality of gas envelopes within the outer shell, and an all-electric propulsion system connected with the outer shell. The gas envelopes may store helium and provide buoyancy lift to the hybrid airship. The all-electric propulsion system may be operated to provide aerodynamic lift to the hybrid airship.

In another aspect of the present invention, an all-electric propulsion system may comprise a high energy density power storage system, an electric motor, a low Reynolds number propeller, a photovoltaic array, and a power conditioning unit. The high energy density power storage system may include a lightweight energy storage medium having a high energy density. The electric motor may receive power from the power storage system during nighttime hours. The low Reynolds number propeller may be coupled and configured to be driven by the electric motor. The photovoltaic array may be configured to provide power to the electric motor during daylight hours and may recharge the power storage system. The power conditioning unit may distribute the electrical power between the photovoltaic array, the energy storage system, and the electric motor.

In still another aspect of the present invention, an airfoil for an hybrid airship may comprise an outer shell having a high-aspect ratio wing shape, and a plurality of conformal gas envelopes within said outer shell. Each of the gas envelopes may be inflatable to form a chamber having at least one flat side. Each of the conformal gas envelopes may store helium. The helium may fill at least substantially the outer shell.

In a further aspect of the present invention, an airfoil for a hybrid airship may comprise an outer shell having a high-aspect ratio wing shape when inflated, and a plurality of independent cylindrical gas envelopes within said outer shell. Each of the cylindrical gas envelopes may store helium. The cylindrical gas envelopes do not expand or contract with altitude change.

In still a further aspect of the present invention, a unmanned reconnaissance aerial vehicle may comprise an outer shell including an upper skin, a lower skin, a rounded leading edge and a sharp trailing edge, a plurality of vertical tails located along the trailing edge, a plurality of cylindrical gas envelopes within the internal volume, an all-electric propulsion system, and a plurality of reservoir gas envelopes. The outer shell may be made out of a semi-rigid material, may be inflatable to a wing shape having a high-aspect ratio and a thick airfoil cross-section and may define an internal volume when inflated. The gas envelopes may receive and store helium and may provide buoyancy lift to the aerial vehicle. The all-electric propulsion system may include a plurality of propulsion pods located along the trailing edge, a high energy density power storage system located within the internal volume, a photovoltaic array located on the upper skin, and a power conditioning unit located within the internal volume. Each of the propulsion pods may include a low Reynolds number propeller coupled and configured to be driven by an electric motor. The power storage system may include an energy storage medium selected from the group of lithium-ion batteries and capacitor banks. The power conditioning unit may distribute the electrical power between the photovoltaic array, the energy storage system, and the electric motor. The all-electric propulsion system may be operated to provides aerodynamic lift to the aerial vehicle. The reservoir gas envelopes may receive excess helium from the cylindrical gas envelopes during an ambient atmospheric pressure decrease.

In still another aspect of the present invention, a method for using a high-aspect ratio hybrid airship as an unmanned reconnaissance aerial vehicle comprises the steps of: providing a high-aspect ratio hybrid airship including an all-electric propulsion system; preparing the hybrid airship for launch; launching the hybrid airship using buoyancy lift alone; letting the hybrid airship ascend vertically to the equilibrium altitude; transitioning the hybrid airship to forward flight by activating the propulsion system; bringing the hybrid airship up to the operational altitude using buoyancy lift and aerodynamic lift; and moving the hybrid airship to a theater of operations using mainly aerodynamic lift.

These and other features, aspects and advantages of the present invention will become better understood with reference to the following drawings, description and claims.

DETAILED DESCRIPTION OF THE INVENTION

Figure 1:
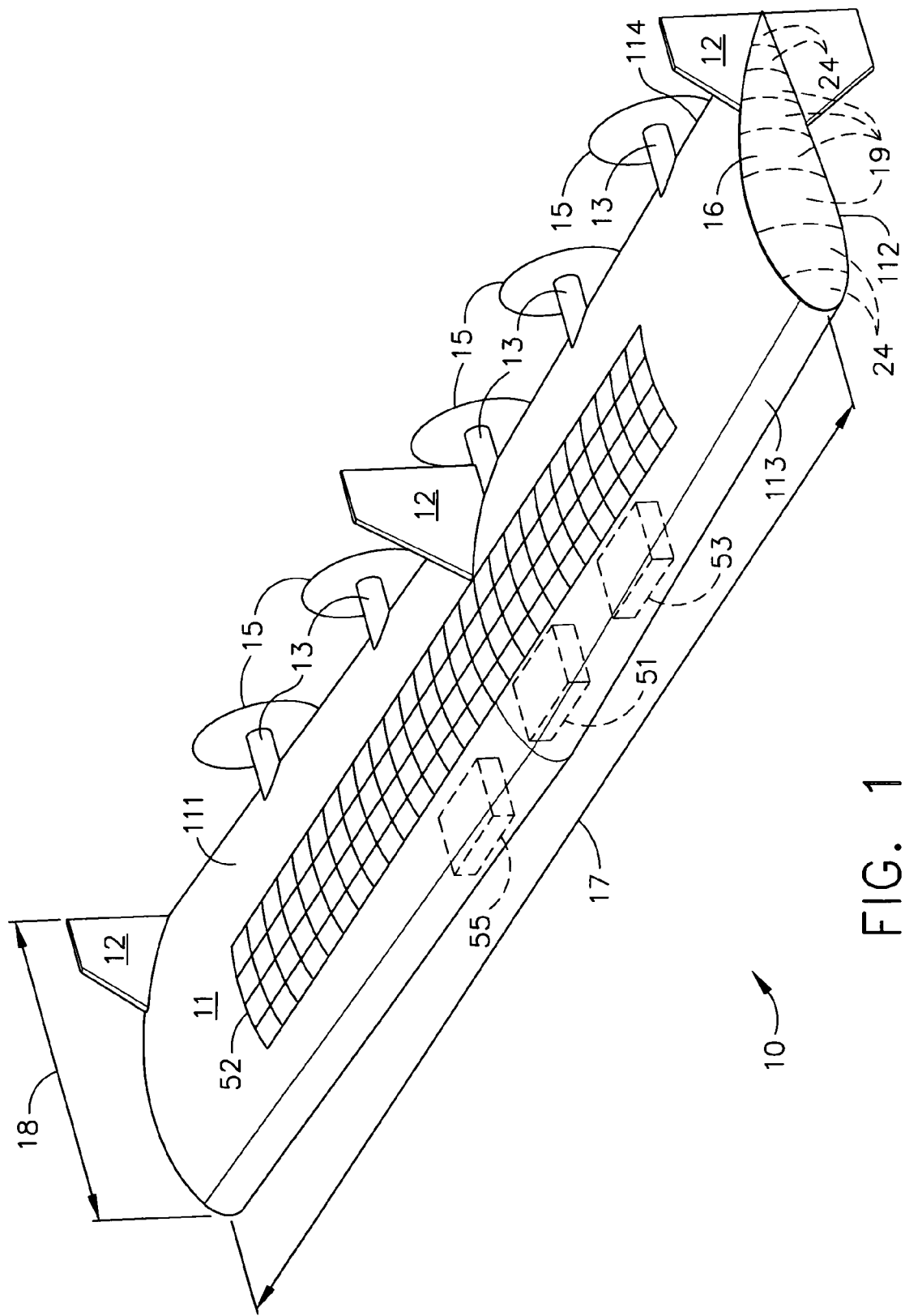
FIG. 1 is a perspective view of a hybrid airship according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention may provide an unmanned aerial vehicle that may be capable to operate at very high altitudes for very long flight endurances. Contrary to the known prior art, the unmanned aerial vehicle of one embodiment of the present invention combines the advantages of heavier-than-air technology and of lighter-than-air technology by providing a hybrid airship that may have the shape of a high-aspect ratio flying wing combined with an all-electric propulsion system. The hybrid airship of one embodiment of the present invention may be used, for example, as a military intelligence, surveillance, and reconnaissance platform, a communications relay platform, and as a platform for directed energy devices. Other applications may include civilian aviation activities, such as reconnaissance and ground surveillance for mapping, traffic monitoring, science, and geological survey, as well as border surveillance, fishery patrols, or the prevention of smuggling and illegal migration.

In accordance with an aspect of the present invention, a hybrid airship may have the shape of a high-aspect ratio flying wing. The high-aspect ratio wing shape may provide low drag, allowing the hybrid airship to fly at an altitude of about 100,000 ft. Contrary to the known prior art, the internal volume of the hybrid airship of one embodiment of the present invention may contain helium only, providing safe operation of the hybrid airship and allowing the airship to be launched using buoyancy lift alone. Therefore, the need for runways or landing gear can be eliminated. By choosing different designs of gas envelopes for holding the helium (e.g., conformal gas envelopes or cylindrical gas envelopes), the buoyancy lift of the hybrid airship can be maximized, or structural efficiency for packaging the helium can be maximized, or an optimal combination of such characteristics can be achieved. Furthermore, by providing the high-aspect ratio wing with a thick airfoil cross-section of one embodiment of the present invention, the hybrid airship of the present invention can be operated at altitudes higher than known prior art aerial vehicles.

Another embodiment of the present invention may provide an all-electric propulsion system for the hybrid airship including low Reynolds number propellers driven by electric motors, a high energy density storage system using either batteries or capacitor banks, and a photovoltaic array. Contrary to known prior art propulsion systems, the propulsion system of one embodiment of the present invention may not require fossil fuels or the use of fuel cells. By regenerating the all-electric propulsion system of one embodiment of the present invention by the photovoltaic array, flight endurance of the hybrid airship may not be limited by the amount of fuel that can be carried, contrary to the known prior art. Furthermore, the power output of the electric motors provided in one embodiment of the present invention may be independent of the ambient atmospheric pressure. By providing the all-electric propulsion system of one embodiment of the present invention, the hybrid airship can be operated at very high altitudes for very long flight endurances. Contrary to the known prior art, the flight time will only be limited by the reliability of the components, which may extend the flight endurance of the hybrid airship of one embodiment of the present invention to one year or more. Flight endurances this long are not possible using known prior art aerial vehicles.

Still another embodiment of the present invention may provide a method for using the hybrid airship as an unmanned reconnaissance aerial vehicle. By being capable to operate at higher altitudes and for longer flight endurances than known prior art unmanned reconnaissance aerial vehicles, such as the Global Hawk, the hybrid airship of one embodiment of the present invention will provide breakthrough capabilities in surveillance and reconnaissance. The hybrid airship of one embodiment of the present invention will be able to operate at very high altitudes out of reach for modern anti-aircraft devices, above the effects of atmospheric weather systems, and providing a maximized line-of-sight radius for sensors and communications equipment. Due to the long flight endurances, uninterrupted intelligence-gathering, surveillance, reconnaissance, and communications relay missions may be conducted having a higher efficiency than current standard procedures.

Figure 5:
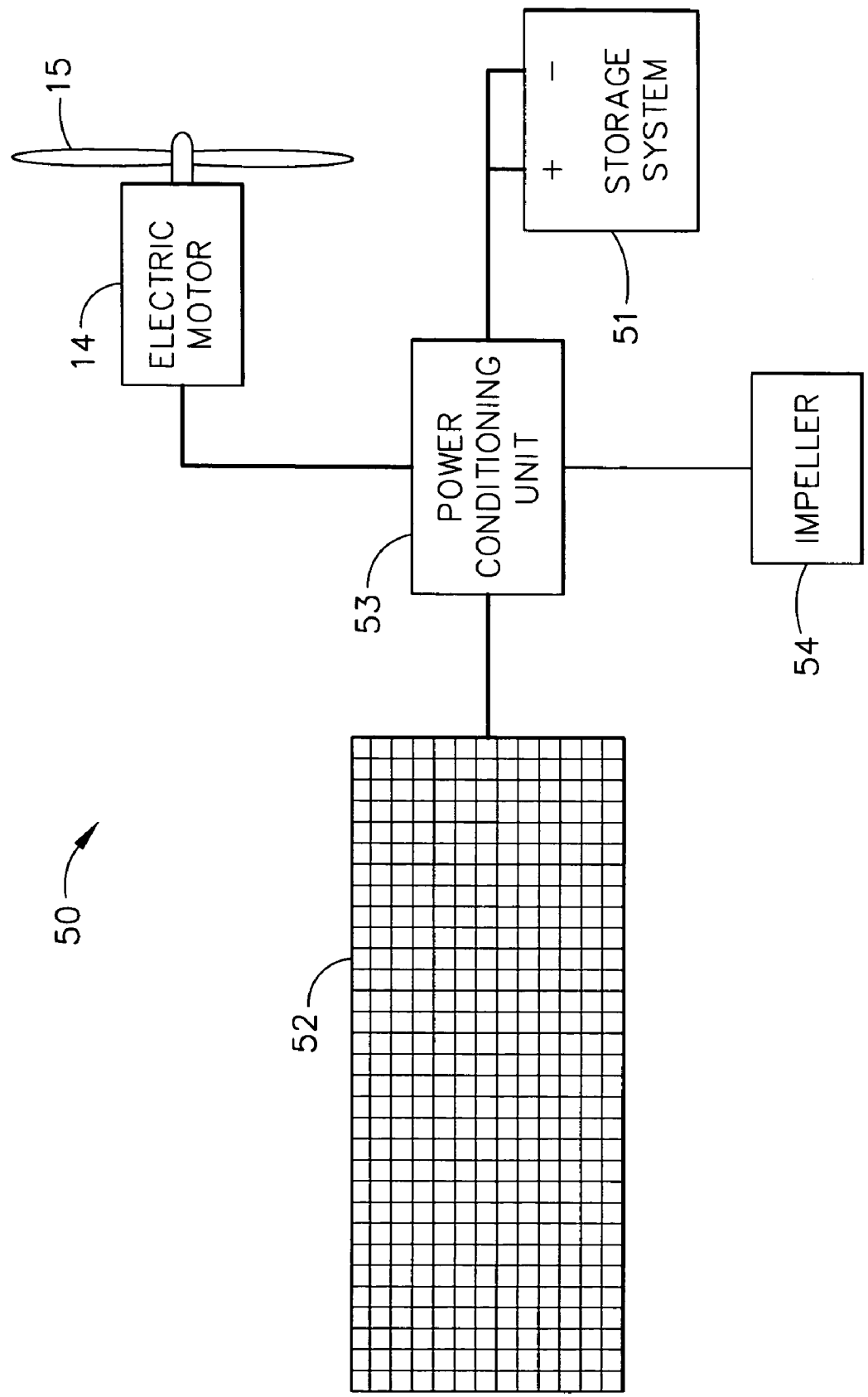
FIG. 5 is a simplified block diagram of an all-electric propulsion system according to one embodiment of the present invention.

Referring now to FIG. 1, a perspective view of a hybrid airship 10 is illustrated according to one embodiment of the present invention. The hybrid airship 10 may be an unmanned aerial vehicle. The hybrid airship 10 may include an outer shell 11, a plurality of vertical tails 12, and a plurality of propulsion pods 13. The outer shell 11 may include an upper skin 111, a lower skin 112, a leading edge 113, and a trailing edge 114. The propulsion pod 13 may include an electric motor 14 and a propeller 15 that are part of the all-electric propulsion system 50, as shown in FIG. 5. The propulsion pods 13 may be located along the trailing edge 114 of the outer shell 11. The vertical tails 12 may provide stability and maneuverability of the hybrid airship 10. The outer shell 11 may be designed in the shape of a large flying wing having a "thick" airfoil cross-section 16. The expression "thick" airfoil cross-section may be used herein to denote a section 16 with a maximum thickness that is at least 14% of the chord 18. As shown in FIG. 1, the airfoil cross-section 16 may have a curved streamline with a rounded leading edge 113 and a sharp trailing edge 114. Further, the outer shell 11 may be designed to have a wing shape when inflated that may have a high-aspect ratio and therefore a very long wing span 17 compared to its chord 18.

The aspect ratio of a wing is defined as the ratio of the wing span 17 to the standard mean chord 18 of the wing, wherein the chord 18 is the distance between the leading edge 113 and the trailing edge 114. The hybrid airship 10 may have an aspect-ratio having a value of at least about 8. Commercial jet aircraft aspect ratios rarely exceed a value of about 7. By designing the hybrid airship 10 to incorporate a high-aspect ratio, the lift-induced drag may be minimized. The outer shell 11 may be preferably manufactured out of a semi-rigid material and, therefore, may be inflatable to a wing shape. The semi-rigid outer shell 11 may define an internal volume when inflated. Also, the outer shell 11 may be manufactured out of a rigid material having a high-aspect ratio wing shape and defining an internal volume. Furthermore, the material of the outer shell 11 may be a multi layer system consisting of structural and insulation layers. The internal volume defined by the outer shell 11 may be filled with helium to allow the hybrid airship 10 to be launched using buoyancy lift alone. The need for runways and landing gear may be eliminated. The helium may be stored inside the outer shell 11 within gas envelopes 19. The helium filled gas envelopes 19 may provide buoyancy lift to the hybrid airship 10 and may support the high-aspect ratio wing shape of the outer shell 11. The hybrid airship 10 may be steered by differential thrusting of the propellers 15. An alternative way to steer the hybrid airship 10 may be the use of thrust vectoring vanes (not shown) behind each propeller 15. Subsystems, such as the energy storage system 50 (FIG. 5), avionics, sensors, and communication antennas, may be distributed throughout the hybrid airship 10 as necessary to balance the airship 10.

Figure 2:
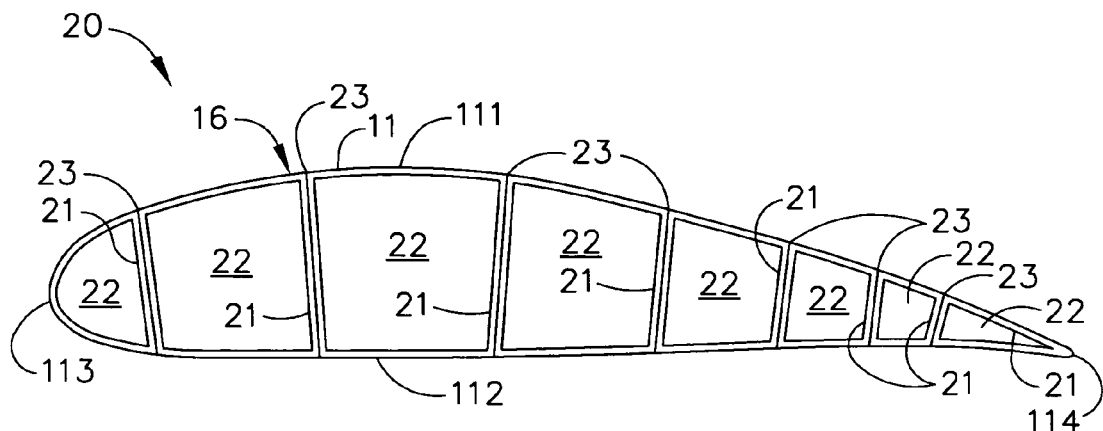
FIG. 2 is a cross-sectional view of a conformal gas envelope design according to one embodiment of the present invention.

Referring now to FIG. 2, a cross-sectional view of a conformal gas envelope design 20 is illustrated according to one embodiment of the present invention. The internal volume of the outer shell 11 may be filled at least substantially entirely with a plurality of conformal gas envelopes 21 so that each inflated envelope forms a chamber having at least one flat side. The internal volume of the outer shell 11 may include structural elements 23, such as vertical members, that may restrict the horizontal expansion of the conformal gas envelopes 21. Further, the conformal gas envelopes 21 may be designed to include at least one flat side when inflated. The conformal gas envelopes 21 may be used to store helium 22. The conformal gas envelopes 21 may be manufactured out of a thin non-porous and light-weight material. The usage of the conformal gas envelopes 21 may have the advantage of maximizing the internal volume of the outer shell 11 for the containment of helium 22, which also maximizes the buoyant lift. In the case of a semi-rigid outer shell 11 the conformal gas envelopes 21 may when inflated be used to maintain the shape and rigidity of the outer shell. Alternate gas envelope geometries may include, for example, multi-bubble cylindrical gas envelopes, as shown in FIG. 3.

Figure 3:
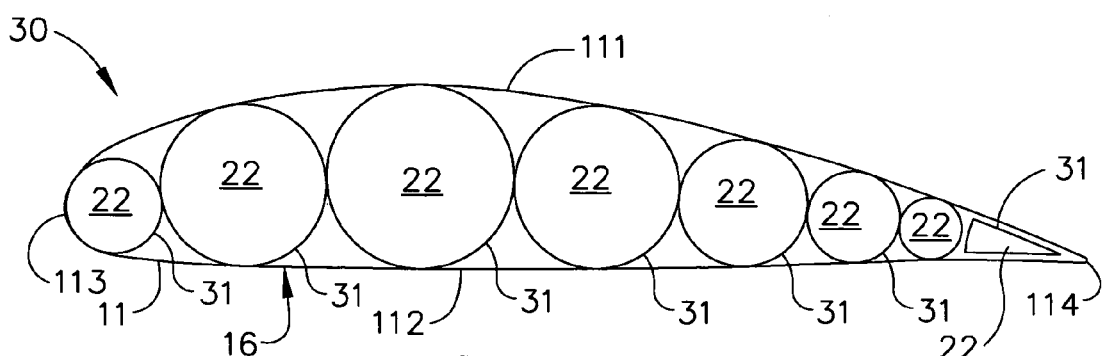
FIG. 3 is a cross-sectional view of a multi-bubble cylindrical gas envelope design according to one embodiment of the present invention.
Figure 4:
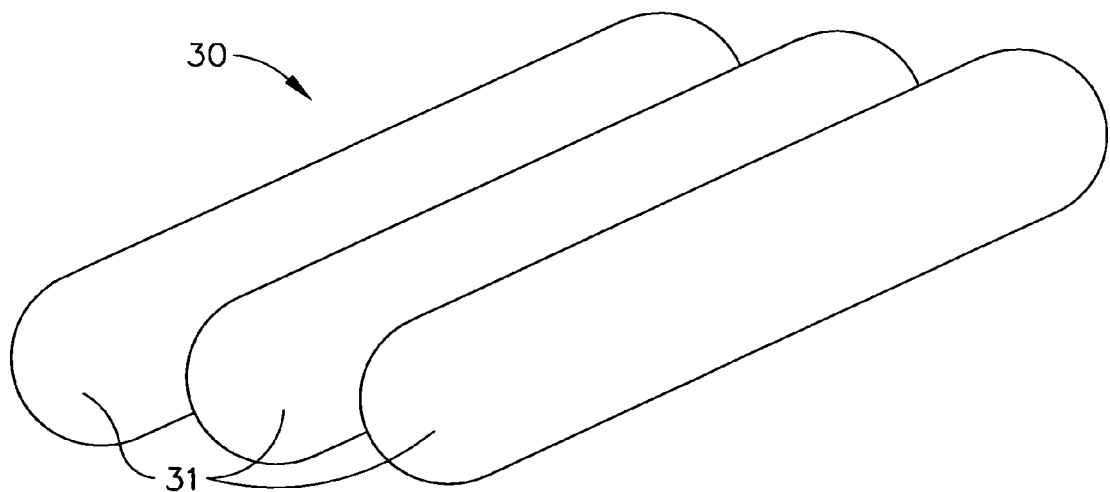
FIG. 4 is a perspective view of a multi-bubble cylindrical gas envelope design according to one embodiment of the present invention.

Referring now to FIG. 3, a cross-sectional view of a multi-bubble cylindrical gas envelope design 30 is illustrated according to one embodiment of the present invention. The internal volume of the outer shell 11 may be filled with a plurality of independent cylindrical gas envelopes 31 that may be used to store helium 22. The cylindrical gas envelopes 31 may be manufactured out of a thin non-porous material. The multi-bubble cylindrical gas envelope design 30 may be more structurally efficient for packaging pressurized helium, since a cylinder withstands hoop stresses better than a flat-side chamber (conformal gas envelope 21, FIG. 2) and is likely to be the lower weight solution compared to the conformal gas envelope design 20. Using the multi-bubble cylindrical gas envelope design 30 may further provide storage space throughout the internal volume of the outer shell while still providing the needed buoyancy lift. A perspective view of multi-bubble cylindrical gas envelopes 31 is shown in FIG. 4. Unlike conventional prior art airship designs, the conformal gas envelopes 21 and the cylindrical gas envelopes 31 are designed not to contract or expand with altitude changes. The hybrid airship 10 may be launched with the gas envelopes 21 or 31 filled to capacity with helium 22. Excess helium 22 may then be gradually pumped into reservoir gas envelopes 24 as the hybrid airship 10 ascends and the ambient atmospheric pressure decreases in order to maintain equilibrium pressure in the gas envelopes 21 or 31. The helium stored in the reservoir gas envelopes 24 may be pumped back into the gas envelopes 21 or 31 later to compensate leakage losses. In addition, the hybrid airship 10 may include a helium storage system (not shown) containing helium that may be used to compensate leakage losses in the gas envelopes 21 (FIG. 2) or 31 (FIG. 3) over a long duration mission.

Referring now to FIG. 5, a simplified block diagram of an all-electric propulsion system 50 is illustrated according to one embodiment of the present invention. The all-electric propulsion system 50 may be connected with the outer shell 11 and may be operated to provide aerodynamic lift to the hybrid airship 10 (FIG. 1). When a wing, such as the hybrid airship 10 (FIG. 1), is propelled through the air, for example, by using the all-electric propulsion system 50, there may be a force upward on the wing due to air passing more quickly over the top of the wing, such as the upper skin 111 (FIG. 1), than the bottom of the wing, such as the lower skin 112 (FIG. 1), which produces a lower pressure on the upper surface, and is known as the Bernoulli effect. The pressure difference between the upper and lower surfaces of the wing, such as the upper skin 111 and the lower skin 112 of the hybrid airship 10, caused by the Bernoulli effect generates a force that tends to lift the wing, such as the hybrid airship 10, against gravity and is, therefore, known as aerodynamic lift. The all-electric propulsion system 50 may include a plurality of propellers 15, a plurality of electric motors 14, a high energy density power storage system 51, a photovoltaic array 52, and a power conditioning unit 53. The propellers 15 may be preferably low Reynolds number propellers. Each propeller 15 may be driven by an electric motor 14. The power output of the electric motor 14 may be completely independent of the ambient atmospheric pressure. The photovoltaic array 52 may power the electric motors 14 during daylight hours while recharging the high energy density power storage system 51 for nighttime operation. Therefore, the flight endurance of the hybrid airship may not be limited by the amount of fuel that can be carried. The photovoltaic array 52 may be located on the upper skin 111 of the outer shell 11 of the hybrid airship 10 (FIG. 1). The power conditioning unit 53 may distribute the power between the photovoltaic array 52, the high energy density power storage system 51, and subsystems of the hybrid airship 10. Subsystems of the hybrid airship 10 may include, for example, a large phased array radar system 56, a directed energy device, and the electric motors 14. The subsystem of the hybrid airship 10 that may use the most electrical power may be the plurality of electric motors 14 that drive the propellers 15. The power conditioning unit 53 may further control the charge/discharge cycle of the high energy density power storage system 51. The high energy density power storage system 51 may be the main component of the all-electric propulsion system 50. The high energy density power storage system 51 may include a lightweight energy storage medium that has a high energy density of about at least 220 W-hr/kg, such as batteries or capacitor banks. Modern lithium-ion batteries may be produced with fairly high energy densities of about 220 W-hr/kg (Watt-hour per kilogram). For a one hour charge, lithium-ion batteries would be needed that weight about 1,000 lb. Another newly developed technology includes lightweight capacitor banks that may have even higher energy densities than lithium-ion batteries. Furthermore, it may be possible to use a lithium-ion battery system built using polymer sheets that is lightweight and has an energy density of about 500 W-hr/kg. By providing the photovoltaic array 52 and the high energy density power storage system 51 to power the all-electric propulsion system 50, the propulsion system 50 may be regenerative and the endurance will be limited only by the operational life and reliability of the system components, such as the electrical motors 14 und propellers 15. The propulsion system 50 may further include an electrically driven impeller 54. The impeller 54 may be operated to provide pressurized air to the gas envelopes 21 (FIG. 2) or 31 (FIG. 3) to replace helium lost through leakage during long flight endurances. The pressurized air may be used to keep the gas envelopes 21 or 31 inflated and to maintain the shape and rigidity of the outer shell 11.

Referring now to Table 1, characteristics of a hybrid airship 10, as illustrated in FIG. 1, are presented according to one embodiment of the present invention.

TABLE 1

|  | High-Aspect Ratio Hybrid Airship |
|---|---|
| Wing Span | 1,065 ft |
| Root Chord | 125 ft |
| Wing Area | 133,000 sq. ft |
| Volume | 1,900,000 cu. ft |
| Cruise Altitude | 100,000 ft |
| Cruise Speed | 105 kt |
| Payload | 4,000 lb |
| Weight | 45,000 lb |

The hybrid airship 10, as illustrated in FIGS. 1, 2, 3, and 4 and equipped with the all-electric propulsion system 50, as illustrated in FIG. 5, may have the characteristics shown in Table 1. With a preferred wing span 17 of about 1,065 ft, a root chord 18 of about 125 ft, and a wing area of about 133,000 sq. ft, the hybrid airship has a high-aspect ratio of about 8.52 that indicates a minimized drag. The hybrid airship 10 with the characteristics shown in Table 1 may operate at cruise altitudes of about 100,000 ft and may reach a cruising speed of about 105 kt while carrying a payload of about 4,000 lb. The flight endurance would only be limited by the operational life and reliability of system components of the hybrid airship 10 and may reach a year or more.

Still referring to Table 1, the lift due to buoyancy force of a helium-filled airship may be calculated from the internal volume using the equation:

$$F_{LIFT}=(P_{air}-P_{He})gV$$

where p is the altitude-dependent density of gas, g is the acceleration of gravity, and V is the volume of the gas envelopes 19 (as shown in FIG. 1). The aerodynamic lift and drag at the cruise altitude may be calculated from the wing area, the airfoil (16) characteristics, and the flight condition. The drag determines the amount of electrical power needed to cruise at the desired altitude, and this may determine the weight of the storage system 50 (shown in FIG. 5), which provides electrical power when the vehicle is cruising at night.

Figure 6:
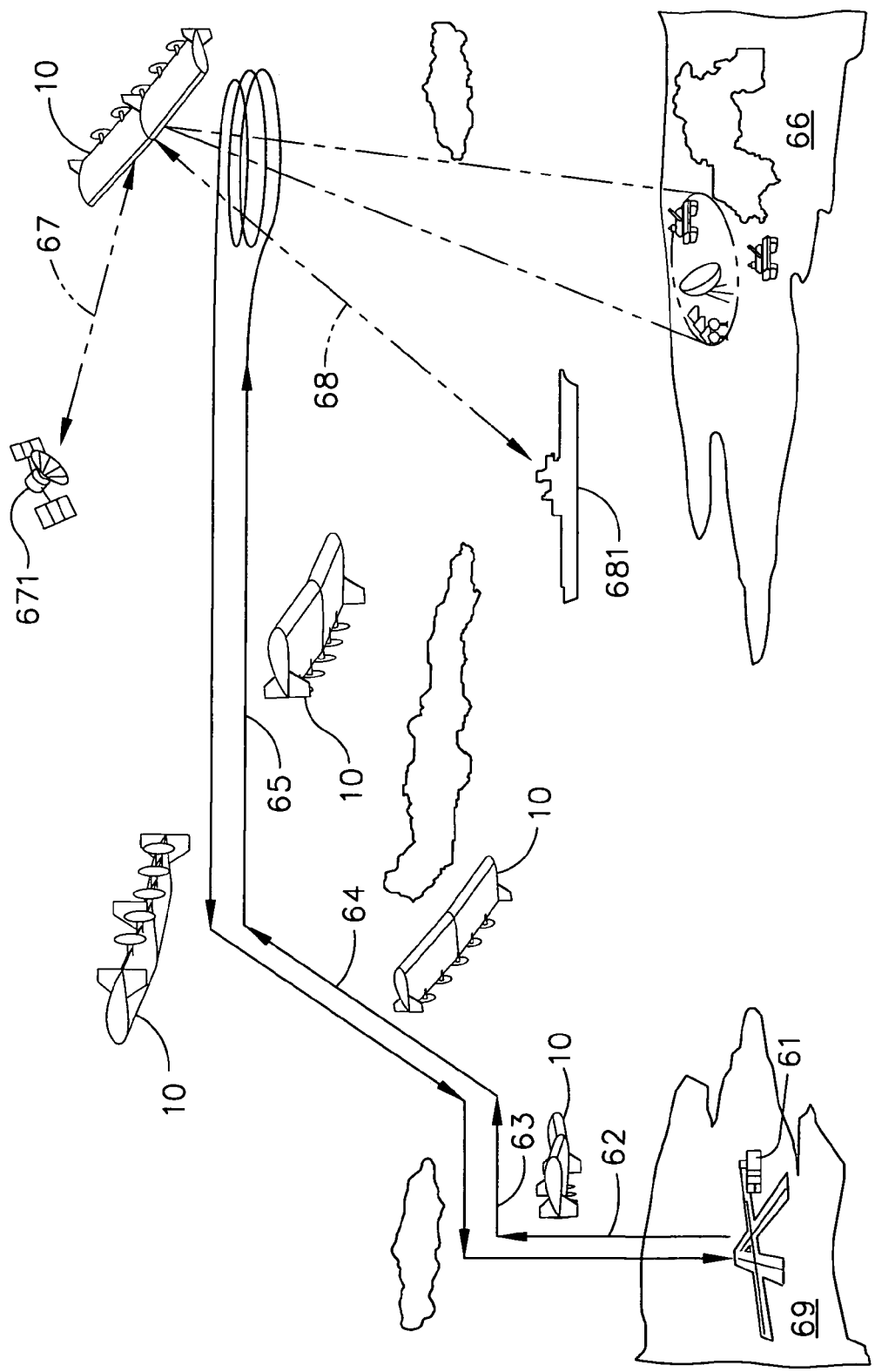
FIG. 6 is a simplified operational diagram of a hybrid airship baseline mission according to one embodiment of the present invention.

Referring now to FIG. 6, a simplified operational diagram of a baseline mission 60 of a hybrid airship 10 is illustrated according to one embodiment of the present invention. The hybrid airship 10 (also shown in FIG. 1) may be housed in a conventional airship hangar 61. The airship hangar may be located at a base 69. The base 69 may be a main base within the continental United States or an allied base. During preparations for launch, the gas envelopes 19 of the hybrid airship 10 (shown in FIG. 1) may be filled with helium 22 to the capacity needed such that the buoyancy lift of the airship exceeds the total weight of the airship 10. Further, the high energy density power storage system 51 (shown in FIG. 5) may be fully charged. At launch the hybrid airship 10 ascends vertically using buoyancy lift 62 alone after it is released from its moorings. The gas envelopes 19 containing helium tend to expand as the airship 10 ascends and the ambient atmospheric pressure decreases. The excess helium 22 may be pumped into reservoir gas envelopes 24. The hybrid airship 10 may stop ascending at the equilibrium altitude 63 once the buoyancy lift 62 has decreased to exactly equal the total weight of the airship 10. The equilibrium altitude 63 may be between about 15,000 ft and about 30,000 ft. In order to continue ascending beyond the equilibrium altitude 63, the hybrid airship may transition to forward flight (64). The speed of the hybrid airship 10 may be gradually increased using the propellers 15 driven by the electric motors 14 (shown in FIG. 1). During the transition to forward flight (64), the aerodynamic lift replaces the buoyancy lift lost as the airship 10 climbs. The rate at which the airship 10 accelerates and climbs to its operational altitude 65 may be optimized to reduce air loads on the hybrid airship 10. At higher altitudes, the aerodynamic lift begins to exceed the buoyancy lift supplied by the helium filled gas envelopes 19. When the hybrid airship 10 has reached the operational altitude 65, buoyancy lift may supply only about 2–5% of the total force needed to keep the aircraft 10 aloft. The operation altitude 65 may be, for example, about 100,000 ft for a payload of about 4,000 lb. Once at the operating altitude 65, the hybrid airship 10 cruises to the assigned theater of operations 66. The cruising speed of the hybrid airship 10 may be around 100 kt. The hybrid airship 10 may spend its entire operational life at this benign flight condition. At an operational altitude 65 of 100,000 ft, for example, ambient winds rarely exceed 40 kt, and the dynamic pressure is less than 2 pounds per square foot. Deploying from an allied base or a permanent base in the continental United States, the hybrid airship 10 may reach any spot in the world within four days. Once the assigned theater of operations 66 is reached, the hybrid airship 10 may be assigned to provide surveillance and reconnaissance capability to a naval task force or other US military forces in the areas. The payload capacity of the airship 10 may accommodate a wide range of options in electro-optical, radar, avionics, and laser designation devices. The payload antennas and devices may be mounted to the lower skin 112 of the outer shell 11 of the hybrid airship 10 (FIG. 1). An avionics suite 55 may be capable of both satellite (67) and line-of-sight (68) communications. The hybrid airship 10 may be capable of continuous operation at the operational altitude 65 for months or even years. The hybrid airship 10 may have a structural life that may be considerably higher compared to the structural life of a fixed wing aircraft since it is an inflatable structure operating under very low flight loads. Furthermore, the hybrid airship 10 (as shown in FIG. 1) may not be subjected to a high number of takeoff and landing cycles or pressurization/depressurization cycles, since the airship 10 may operate continuously at high altitude cruise condition using the regenerative all-electric propulsion system 50 (as shown in FIG. 5). The major limiting factor that may determine the lifetime of the hybrid airship 10 may therefore be the operational life and reliability of the propulsion system 50 and other airship subsystems.

Since the operational lifetime of the hybrid airship 10 (as shown in FIG. 1) may be limited mainly by the operational lifetime and reliability of the subsystems of the airship 10 rather than the airframe lifetime, it may be more cost effective to design the hybrid airship 10 as a single mission expendable vehicle. The design of the hybrid airship 10, as shown in FIG. 1, could be simplified, for example, by not requiring a large supply of helium 22 to replace leakage losses. As helium 22 leaks from the gas envelopes 21 (FIG. 2) or 31 (FIG. 3), a simple electrically driven impeller 54 may be able to keep the gas envelopes 21 or 31 inflated to the proper pressure to maintain the shape and rigidity of the outer shell 11 (FIG. 1). This will result in a gradual loss of buoyancy, but at the operational altitude 65 (FIG. 6) the buoyancy force only supplies less than about 5% of the total lift. The aerodynamic lift may be increased to accommodate this loss by a slight increase in the wing lift coefficient. Once all of the helium 22 has leaked out of the gas envelopes 21 (FIG. 2) or 31 (FIG. 3) and has been replaced with pressurized air, the hybrid airship 10 essentially may become a large inflatable aircraft. Making the hybrid airship 10 expendable may also reduce the amount of infrastructure at the main base 69 (FIG. 6). The purpose of the main base 69 in this case may be only to launch new hybrid airships 10, but not to recover or maintain hybrid airships 10 in service. Still, if a hybrid airship 10 would experience an equipment malfunction relatively early in the mission of the airship 10, the hybrid airship 10 may be able to return to the main base 69 for repairs and redeployment.

Figure 7:
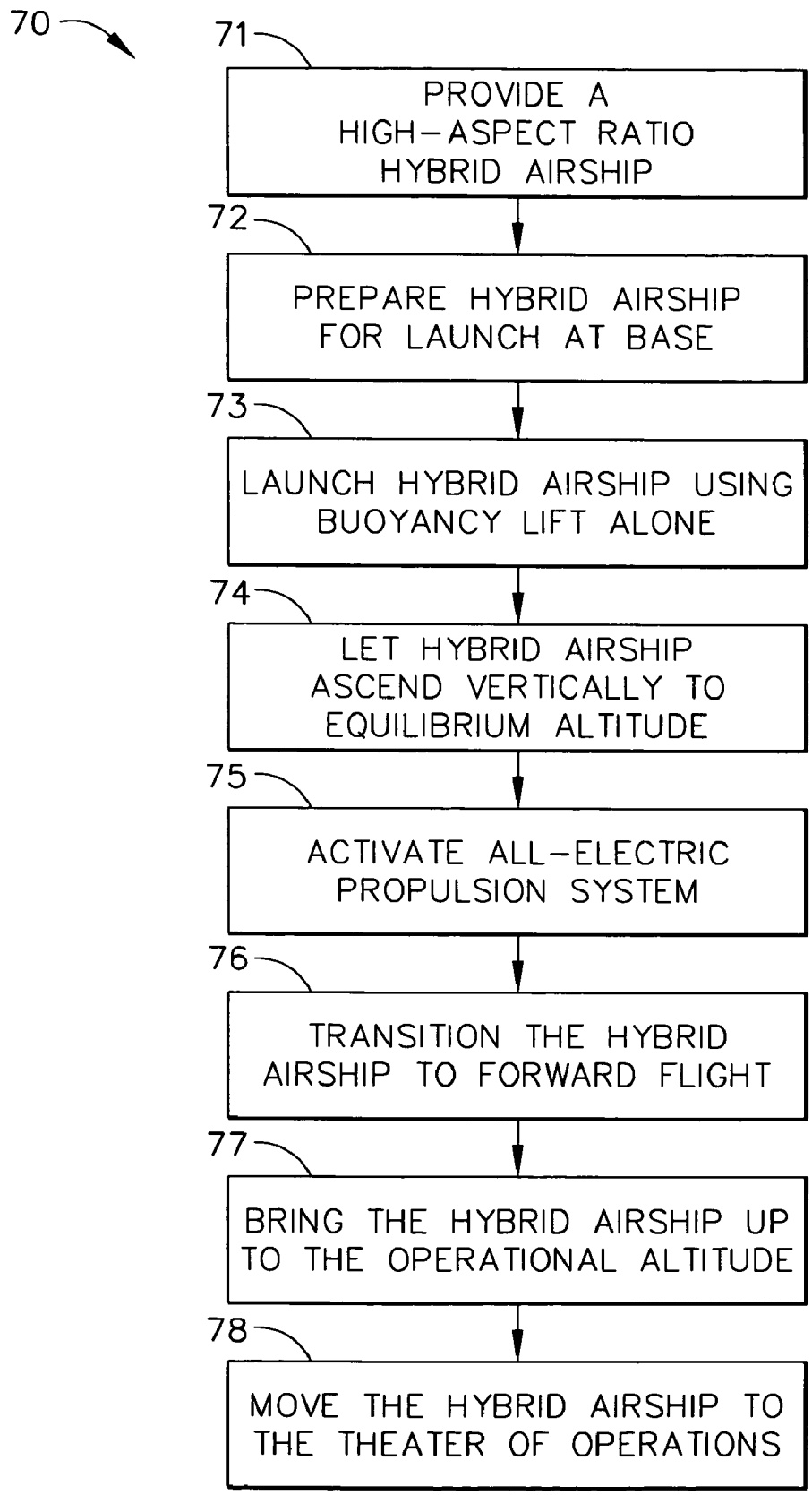
FIG. 7 is a flow chart of a method for using a hybrid airship as a unmanned reconnaissance aerial vehicle according to one embodiment of the present invention.

Referring now to FIG. 7, a flow chart of a method 70 for using the high-aspect ratio hybrid airship 10 as an unmanned reconnaissance aerial vehicle is illustrated according to another embodiment of the present invention. The method 70 (also shown by the arrows in FIG. 6) for using the high-aspect ratio hybrid airship 10 (as shown in FIG. 1 and as described above) as an unmanned reconnaissance aerial vehicle may include the steps of: providing an high-aspect ratio hybrid airship 10 that may include an all-electric propulsion system 50 (step 71); preparing the hybrid airship 10 for launch at base 69 (step 72); launching the hybrid airship using buoyancy lift 62 alone (step 73); letting the hybrid airship 10 ascend vertically to the equilibrium altitude 63 (step 74); activating the propulsion system 50 (step 75); transitioning the hybrid airship 10 to forward flight (step 76); bringing the hybrid airship up to the operational altitude 65 (step 77); and moving the airship 10 to the theater of operations 66 (step 78). The method 70 may further include the steps of: assigning the hybrid airship 10 to provide surveillance and reconnaissance capability to a naval task or other US military forces; establishing satellite communication 67 between the hybrid airship 10 and a strategic satellite 671; establishing line-of-sight communications 68 between the hybrid airship 10 and a ground station; cruising with the hybrid airship 10 over the theater of operations for an extended period of time; providing uninterrupted intelligence, surveillance, and reconnaissance information for an extended period of time; and returning the hybrid airship 10 to the base 69. Although the high-aspect ratio hybrid airship 10 has been described as being used as an unmanned reconnaissance aerial vehicle, other applications may be possible.

It should be understood, of course, that the foregoing relates to exemplary embodiments of the invention and that modifications may be made without departing from the spirit and scope of the invention as set forth in the following claims.

We claim:

1. A high-aspect ratio hybrid airship, comprising:
   a single outer shell having a high-aspect ratio wing shape and a thick airfoil cross-section, wherein said outer shell has a constant wingspan that is at least eight times longer than the mean chord of said outer shell;
   a plurality of independent gas envelopes within said outer shell, wherein said gas envelopes store helium and provide buoyancy lift to said hybrid airship; wherein said gas envelopes are the only structural shell support elements contained within said outer shell; and
   an all-electric propulsion system connected with said outer shell, wherein said all-electric propulsion system is operable to provide forward flight of said outer shell that generates aerodynamic lift of said hybrid airship.

2. The high-aspect ratio hybrid airship of claim 1, wherein said outer shell is made out of a semi-rigid material, is inflatable to a wing shape having a high-aspect ratio, and defines an internal volume when inflated.

3. The high-aspect ratio hybrid airship of claim 1, wherein said outer shell defines an internal volume and is made out of a rigid material, said rigid material maintaining said internal volume.

4. The high-aspect ratio hybrid airship of claim 1, wherein said outer shell includes an upper skin, a lower skin, a rounded leading edge, and a sharp trailing edge.

5. The high-aspect ratio hybrid airship of claim 4, further comprising a plurality of vertical tails located along said trailing edge.

6. The high-aspect ratio hybrid airship of claim 4, wherein said all-electric propulsion system includes a plurality of propulsion pods located along said trailing edge, a high energy density power storage system including lightweight capacitor banks, a photovoltaic array located on said upper skin, and a power conditioning unit.

7. The high-aspect ratio hybrid airship of claim 6, wherein each of said propulsion pods includes an electric motor and a propeller.

8. The high-aspect ratio hybrid airship of claim 7, wherein said propeller comprises a low Reynolds number propeller suitable to operate at cruise altitudes of about 100,000 ft.

9. The high-aspect ratio hybrid airship of claim 1, wherein said gas envelopes comprise conformal gas envelopes.

10. The high-aspect ratio hybrid airship of claim 1, wherein said gas envelopes comprise cylindrical gas envelopes.

11. The high-aspect ratio hybrid airship of claim 1, further comprising a plurality of reservoir tanks, wherein said helium is replenished from said reservoir tanks to compensate leakage losses in said gas envelopes.

12. A hybrid airship, comprising:
    a single outer shell having a high-aspect ratio wing shape and a thick airfoil cross-section, wherein said aspect ratio is at least about 8, and wherein said cross-section has a maximum thickness that is at least about 14% of the chord of said outer shell;
    a plurality of gas envelopes within said outer shell, wherein said gas envelopes store helium and provide buoyancy lift to said hybrid airship; wherein said gas envelopes are the only structural shell support elements contained within said outer shell; and
    an all-electric regenerative propulsion system connected with said outer shell, wherein said all-electric propulsion system includes lightweight capacitor banks and a photovoltaic array and is operable to provide forward flight of said outer shell that generates continuous aerodynamic lift of said hybrid airship; and
    an electrically driven impeller, wherein said impeller provides pressurized air to keep said gas envelopes inflated after said helium is lost through leakage.

13. The hybrid airship of claim 12, wherein said outer shell has a wing area of at least about 130,000 sq. ft.

14. The hybrid airship of claim 12, wherein said all-electric regenerative propulsion system includes a plurality of propellers that are used to steer said hybrid airship through differential thrusting.

15. A hybrid airship, comprising:
    a single outer shell having a high-aspect ratio wing shape and a thick airfoil cross-section, wherein said outer shell has a constant wingspan of about 1,065 ft, a root chord of about 125 ft, and an aspect ratio of about 8.52;
    a plurality of gas envelopes within said outer shell, wherein said gas envelopes store helium and provide buoyancy lift to said hybrid airship; wherein said gas envelopes are the only structural shell support elements contained within said outer shell; and
    an all-electric regenerative propulsion system connected with said outer shell, wherein said propulsion system includes;
        a plurality of propellers each driven by an electric motor;
        a high energy density power storage system including lightweight capacitor banks as energy storage medium and providing electrical power to said electric motors during nighttime hours;
        and a photovoltaic array providing electrical power to said electric motors and recharging said high energy density power storage system during daylight hours;
    wherein said all-electric propulsion system is operable to provide forward flight of said outer shell that generates aerodynamic lift of said hybrid airship; and
    wherein said propulsion system enables operation of said airship at cruise altitudes of about 100,000 ft.

16. The hybrid airship of claim 15, wherein said propulsion system enables said airship to cruise at a speed of about 105 kt while carrying a payload of about 1,000 lb.

17. The hybrid airship of claim 16, wherein said payload is integrated into said outer shell, and wherein said payload is selected from the group of transceiver elements that form a large phased array antenna, large area electromagnetic antennas, and high power directed energy devices.

* * * * *